(12) United States Patent
Lambert

(10) Patent No.: US 10,312,752 B2
(45) Date of Patent: Jun. 4, 2019

(54) SWITCHED RELUCTANCE MOTOR WITH MULTIPLE POLE SETS AND ROBUST BEHAVIOR UNDER ROTOR DISPLACEMENT

(71) Applicant: Tim Lambert, Guelph (CA)

(72) Inventor: Tim Lambert, Guelph (CA)

( * ) Notice: Subject to any disclaimer, the term of this patent is extended or adjusted under 35 U.S.C. 154(b) by 224 days.

(21) Appl. No.: 15/022,769

(22) PCT Filed: Sep. 19, 2014

(86) PCT No.: PCT/CA2014/000705
§ 371 (c)(1),
(2) Date: Mar. 17, 2016

(87) PCT Pub. No.: WO2015/039220
PCT Pub. Date: Mar. 26, 2015

(65) Prior Publication Data
US 2016/0233729 A1    Aug. 11, 2016

Related U.S. Application Data

(60) Provisional application No. 61/880,384, filed on Sep. 20, 2013.

(51) Int. Cl.
| H02K 1/14 | (2006.01) |
| H02K 1/24 | (2006.01) |
| H02K 19/10 | (2006.01) |
| H02K 3/18 | (2006.01) |

(52) U.S. Cl.
CPC ............... *H02K 1/14* (2013.01); *H02K 1/146* (2013.01); *H02K 1/246* (2013.01); *H02K 3/18* (2013.01); *H02K 19/103* (2013.01)

(58) Field of Classification Search
CPC .......... H02K 1/14; H02K 1/146; H02K 1/246; H02K 1/06; H02K 3/18; H02K 19/103; H02K 19/10
USPC ................................ 310/185, 184, 180, 268
See application file for complete search history.

(56) References Cited

FOREIGN PATENT DOCUMENTS

| JP | 2011182495 | 9/2011 | |
| JP | 2011182495 A | * 9/2011 | ............. H02K 19/12 |

OTHER PUBLICATIONS

Machine translation of JP 2011182495 A (Sep. 2011).*
Murere, Guillaume, PCT Examiner, "PCT International Search Report", dated Dec. 11, 2014, PCT/CA2014/000705.

* cited by examiner

*Primary Examiner* — Michael Andrews
(74) *Attorney, Agent, or Firm* — Perry + Currier, Inc.

(57) ABSTRACT

To reduce stray magnetic fields and the accompanying inefficiency in electric motors, the present specification provides a motor having a plurality of stator poles and rotor poles. The rotor poles are configured to rotate across the stator poles. Each of the rotor poles has a first rotor pole component and a second rotor pole component disposed on opposite sides of the plurality of stator poles. Each of the stator poles comprises at least a first sub-pole and a second sub-pole arranged such that at least a portion of magnetic flux from the first sub-pole flows through the first rotor pole component, through the second sub-pole, through the second rotor pole component and back through the first subpole. As the rotor poles rotate with respect to the stator poles, the magnetic flux exerts a rotating force on the plurality of rotor poles.

22 Claims, 18 Drawing Sheets

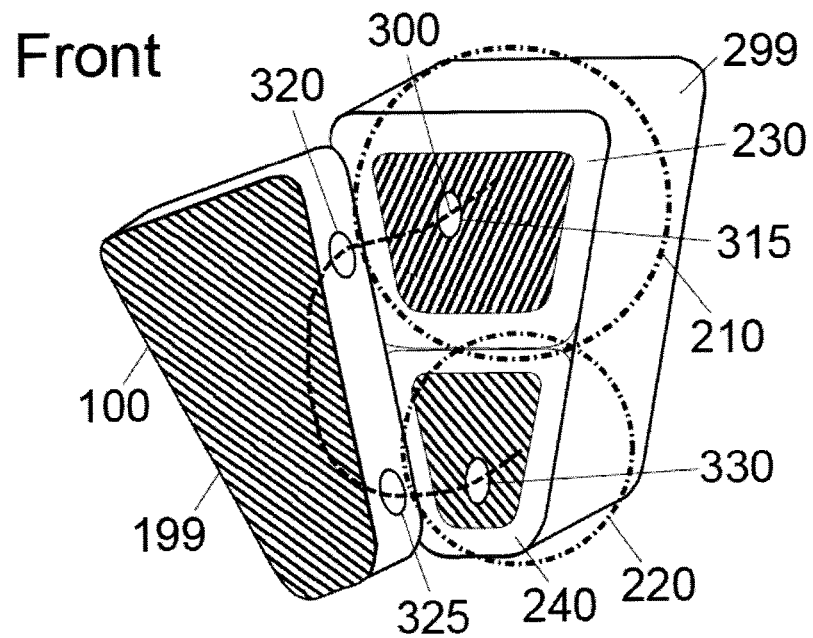
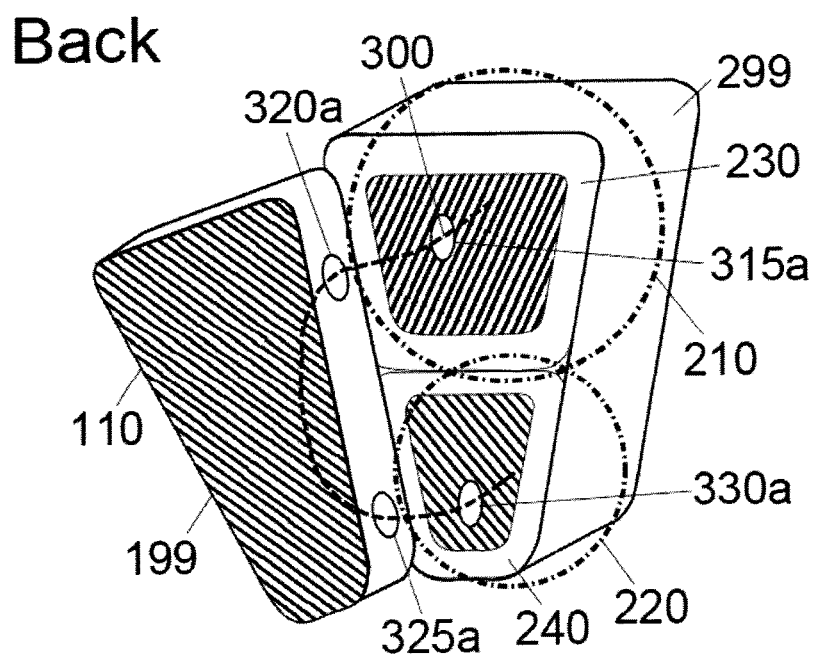
FIG. 9

SWITCHED RELUCTANCE MOTOR WITH MULTIPLE POLE SETS AND ROBUST BEHAVIOR UNDER ROTOR DISPLACEMENT

FIELD

The specification relates generally to motors, and specifically to a switched reluctance motor with multiple pole sets and robust behaviour under rotor displacement.

BACKGROUND

In-wheel drives are the lightest, most direct, highest efficiency means of propelling wheeled vehicles. They can be used in vehicles of all sizes, ranging from electric bicycles to transport trucks and commercial jets. One of the first vehicles to use an in-wheel drive was Ferdinand Porsche's prototype—the precursor to the first all-wheel-drive electric car. In the time since Porsche's vehicle was introduced, combustion-powered engines have dominated the passenger vehicle market due to their high power density. With that said, technology has improved in recent decades, leading to advances in materials, control, and design. Several companies have introduced new in-wheel drive systems that take advantage of these advances, but the industry has been hesitant to accept these systems. Industry hesitation has been fuelled by problems that come from three primary sources: technological maturity, vehicle drivability, and battery technology.

Although in-wheel motors have been available for over 100 years, most modern devices are based on very new technology. These new devices are primarily brushless DC and induction motors, and they share many design features, including the use of permanent magnets on the rotor, and copper windings on the stator. Such motors have several innate problems regarding in-wheel applications. The use of permanent magnets increases their cost and reduces their durability, and in some cases the use of an internal rotor also introduces concerns regarding the sealing of their cases.

With regard to the second major source of problems that stand in the way of the in-wheel drive market, the implementation of in-wheel drives in modern vehicles results in a variety of suspension-related safety issues. By attaching a motor to the wheel, the unsprung mass is increased, and thus the response of the suspension system to disturbances is slowed. This phenomenon can be beneficial in circumstances where the tire does not leave the road, but when the tire does, the vehicle can experience a loss of steering control. Such effects are typically not noticed in everyday driving, but some subjective changes to the drivability of the vehicle do occur. Many of these changes can be mitigated by reconfiguring the suspension system to suit the increased unsprung mass, but a vehicle with an increased unsprung mass will always have a reduced suspension capability in comparison to a vehicle with a small unsprung mass.

The final major source of problems for in-wheel motor vehicles is battery technology. Batteries are known to have a poor response to thermal variations; they have been featured in several prominent accidents caused by battery combustion, they are expensive, and they are heavy. Most in-wheel motor developers are focused on mass-market adoption of their systems, but few have considered the specific configuration of the complete drive system that their motor will become a part of. In-wheel motors have thus succumbed to the same issues that have limited the growth of the electric vehicle market.

SUMMARY

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

Aspects of the present specification can provide a motor that is durable, inexpensive, and easy to seal. The motor can also be configured to reduce the unsprung mass, resulting in an improvement in drivability, and permitting further modifications to the suspension system to mitigate the impact of disturbances. Further, the motor can be included in a variety of drive system configurations, allowing it to circumvent the barriers to the electric vehicle industry.

Specifically, the set of features presented herein comprise a plurality of electric motor implementations which can be used for direct-drive automotive applications. These implementations can also be applied to industrial, commercial, consumer, and personal uses due to their featured characteristics of simplicity, durability, high performance, and high efficiency. Further features of the plurality of motor implementations can include the ability to interface with suspension systems, and to be configured in a range of geometric, electrical, and operational forms.

Numerous direct-drive motors have been proposed in academic and industrial settings that seek to fulfil the stated characteristics, but many of these motors and devices do not address critical features that ensure alignment with public concerns including reliability, safety, and scalability.

Thus, what is desired, and not to this date developed, is a motor or device which can consistently and transparently meet the expectations of the market and the industry. More specifically, the products that include such motors are expected to maintain a high level of operational safety and reliability, improve user comfort, provide increased performance compared to contemporary products, and be available at a low price. Accordingly, a direct-drive system for a vehicle application can have a low mass, high power density, low cost, and common material composition.

Hence, provided herein is a motor having low total mass, and an even lower rotor mass, as compared to prior art motors. The motor provided herein can further provide good quality performance as a component of a larger system, including but not limited to, a steering assembly, a suspension system, and a vehicle drive system.

Furthermore, the motor provided herein can operate at high efficiency, and can be reconfigured for a wide variety of applications.

Present implementations of the motor configuration discussed herein can provide a motor topology which maximizes the quantity of torque produced in a given motor volume.

Present implementations of the motor configuration discussed herein can provide a motor assembly which can be configured in a plurality of orientations that lie perpendicular to the direction of motion or along the direction of motion.

Present implementations of the motor configuration discussed herein are referred to using several axes, which reflect a coordinate system in which the motor is arranged.

The axes are defined using the terms 'radial', 'axial', and 'tangential'. A radial axis, or radial direction, points outward from the center of the motor, along the radius of the machine. An axial axis, or axial direction, points along the axis of rotation, from one side of the motor to the other side, and is generally perpendicular to a radial axis and/or a direction of rotation of the motor. A tangential axis, or tangential direction, is the instantaneous direction of motion of the rotor, which is tangent to the circumference of the machine. An additional direction is defined herein as the 'direction of magnetic flux', which points along the length of a stator pole, defined along whichever of the radial, axial, and tangential directions represents the average direction of the flux flow through the center of that stator pole.

Present implementations of the motor configuration discussed herein provide a motor assembly which can include the use of shaped poles along a direction perpendicular to a direction of motion of rotors, and perpendicular to a direction of magnetic flux. Herein, the direction perpendicular to the direction of motion, and perpendicular to the direction of magnetic flux, can be referred to as the 'sub-pole direction'. The poles shaped along the sub-pole direction can be shaped in a plurality of ways and in a plurality of geometries, including but not limited to teeth with sharp edges, curves with rounded edges, teeth with blunt edges, and the like.

An aspect of the present specification provides a switched motor comprising: a plurality of stator poles; and, a plurality of rotor poles, the plurality of rotor poles configured to rotate across the plurality of stator poles, each of the plurality of rotor poles comprising a first rotor pole component and a second rotor pole component disposed on opposite sides of the plurality of stator poles, each of the plurality of stator poles comprising at least a first sub-pole and a second sub-pole arranged such that at least a portion of magnetic flux from the first sub-pole flows through the first rotor pole component, through the second sub-pole, through the second rotor pole component and back through the first rotor pole, and, as the plurality of rotor poles rotate with respect to the plurality of stator poles, the magnetic flux exerting a rotating force on the plurality of rotor poles.

The plurality of rotor poles and the plurality of stator poles can be arranged in the radial direction with respect to each other, with the plurality of stator sub-poles arranged in the axial direction with respect to each other.

The plurality of rotor poles and the plurality of stator poles can be arranged in the axial direction with respect to each other, with the plurality of stator sub-poles arranged in the radial direction with respect to each other.

A number of each of the plurality of rotor poles and the plurality of stator poles can be greater than or equal to two.

A number of each of the plurality of rotor poles and the plurality of stator poles can be even.

A number of each of the plurality of rotor poles and the plurality of stator poles can be odd.

A number of the plurality of stator poles can be not equal to a respective number of the plurality of rotor poles.

A number of the plurality of stator poles can be equal to a number of the plurality of rotor poles.

A number of the plurality of stator sub-poles can be two.

A number of the plurality of stator sub-poles can be greater than two.

A number of the plurality of stator sub-poles can be even.

A number of the plurality of stator sub-poles can be odd.

Each of the surfaces of the plurality of stator poles can have a shape along the sub-pole direction configured to permit rotation of each of the first rotor pole component and the second rotor pole component disposed on opposite sides of the plurality of stator poles.

Each of the surfaces of the plurality of rotor poles can have a shape along the sub-pole direction which can be similar to a respective shape along the sub-pole direction of the surfaces of the plurality of stator poles.

Each of the plurality of stator poles and the plurality of rotor poles can comprise one or more of: a flat shape along the sub-pole direction producing a flat interface between the plurality of stator poles and the plurality of rotor poles; a curved shape along the sub-pole direction producing a curved interface between the plurality of stator poles and the plurality of rotor poles; a segmented shape along the sub-pole direction producing a segmented interface between the plurality of stator poles and the plurality of rotor poles; and, a toothed shape along the sub-pole direction producing a toothed interface between the plurality of stator poles and the plurality of rotor poles.

Each of the plurality of rotor poles can comprise a surface area less than, equal to, or greater than a respective surface area of each of the plurality of stator poles.

The plurality of rotor poles can be arranged such that at least some overlap occurs with the plurality of stator poles, regardless of a rotational position of the plurality of rotor poles with respect to the plurality of stator poles.

Each of the plurality of rotor poles and the plurality of stator poles can be similarly shaped in a radial cross-section.

Each of the first sub-pole and the second sub-pole of each of the plurality of stator poles can comprise a core component and a winding.

The plurality of rotor poles and the plurality of stator poles can be arranged such that a displacement of the plurality of rotor poles along a direction perpendicular to a direction of rotation does not affect a total overlap of the plurality of rotor poles with the plurality of stator poles.

The plurality of rotor poles and the plurality of stator poles can be arranged such that a displacement of the plurality of rotor poles along a direction perpendicular to a direction of rotation produces an identical overlap of the plurality of rotor poles with the plurality of stator poles.

The plurality of rotor poles and the plurality of stator poles can be arranged such that a displacement of the plurality of rotor poles along a direction perpendicular to a direction of rotation changes the an overlap of the plurality of rotor poles with the plurality of stator poles.

BRIEF DESCRIPTION OF THE DRAWINGS

For a better understanding of the various implementations described herein and to show more clearly how they may be carried into effect, reference will now be made, by way of example only, to the accompanying drawings in which:

FIG. 9 shows two perspective views of a single pole of the motor of FIG. 3, comprised of two rotor pole components and one stator pole, with a front view showing a first rotor pole component and the stator pole and a back view showing a second rotor pole component and the stator pole, according to non-limiting implementations.

DETAILED DESCRIPTION

Figure 1:
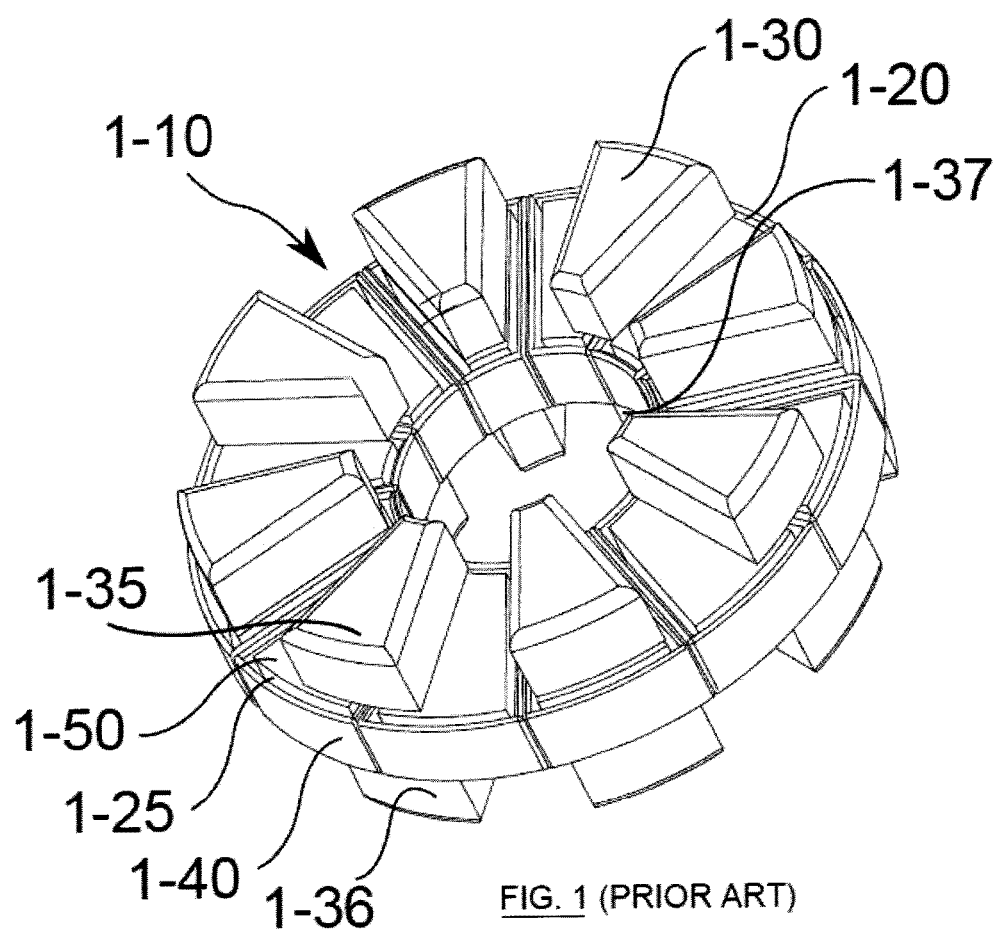
FIG. 1 is a perspective view of a prior art switched reluctance motor.

FIG. 1 shows a typical prior art motor 1-10, including several stator poles 1-20, several rotor poles 1-30, pole windings 1-40, and core components 1-50. The functional link, or yoke, between each rotor pole 1-30 is not shown, where such a link would carry magnetic flux from one pole to the next. The prior art motor produces magnetic flux using electric current that passes through the pole windings 1-40. This magnetic flux passes through the stator pole 1-20 to a rotor pole 1-30, from that rotor pole 1-30 to another rotor pole 1-35 on the same side of the motor, back through a stator pole 1-25 to the opposite side of the motor, and then back through the corresponding set of rotor poles 1-36 and 1-37 to reach the original stator pole 1-20, forming a loop. The loop is deformed when the rotor and stator poles are in an unaligned position, and the natural tendency of a system to seek its lowest-energy equilibrium causes a torque to occur until the rotor and stator poles are in an aligned position.

Figure 2:
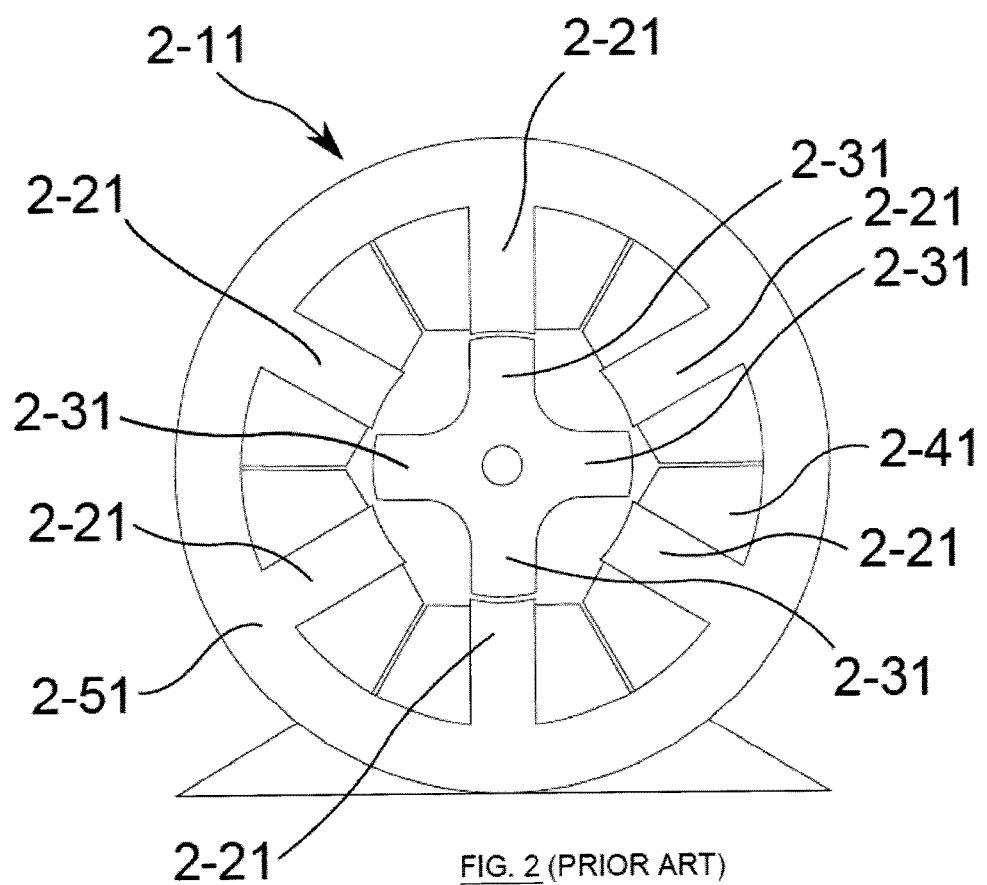
FIG. 2 is an axial view of a prior art switched reluctance motor.

FIG. 2 shows a typical switched reluctance motor assembly 2-11, according to the prior art, including several stator poles 2-21, several rotor poles 2-31, pole windings 2-41, and core components 2-51. The stator poles 2-21 produce the magnetic flux that is used to generate torque. The rotor poles 2-31 act as passive components through which magnetic flux passes. Pole windings 2-41 are composed of a conductive material, and are designed to carry an electrical current, which in turn creates magnetic flux. Core components 2-51 refer to any part of the motor which is designed to carry a magnetic flux, or which increases the permeability of the device beyond a nominal level. A switched reluctance motor may also contain a different number of rotor poles 2-31 than stator poles 2-21. Other embodiments of a switched reluctance motor may comprise numbers of rotor and stator poles different than those shown in FIG. 2.

Figure 3:
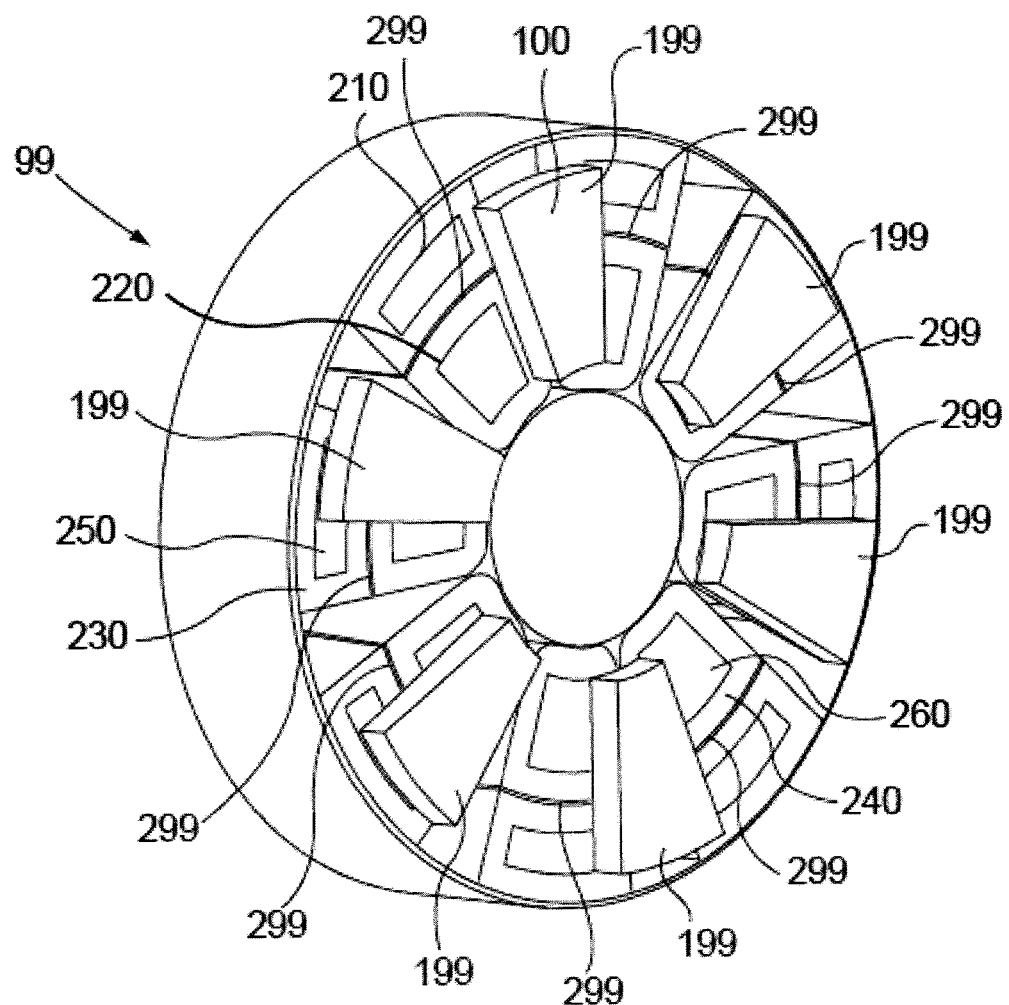
FIG. 3 is a perspective view of one possible configuration of a switched reluctance motor with multiple pole sets, according to non-limiting implementations.
Figure 4:
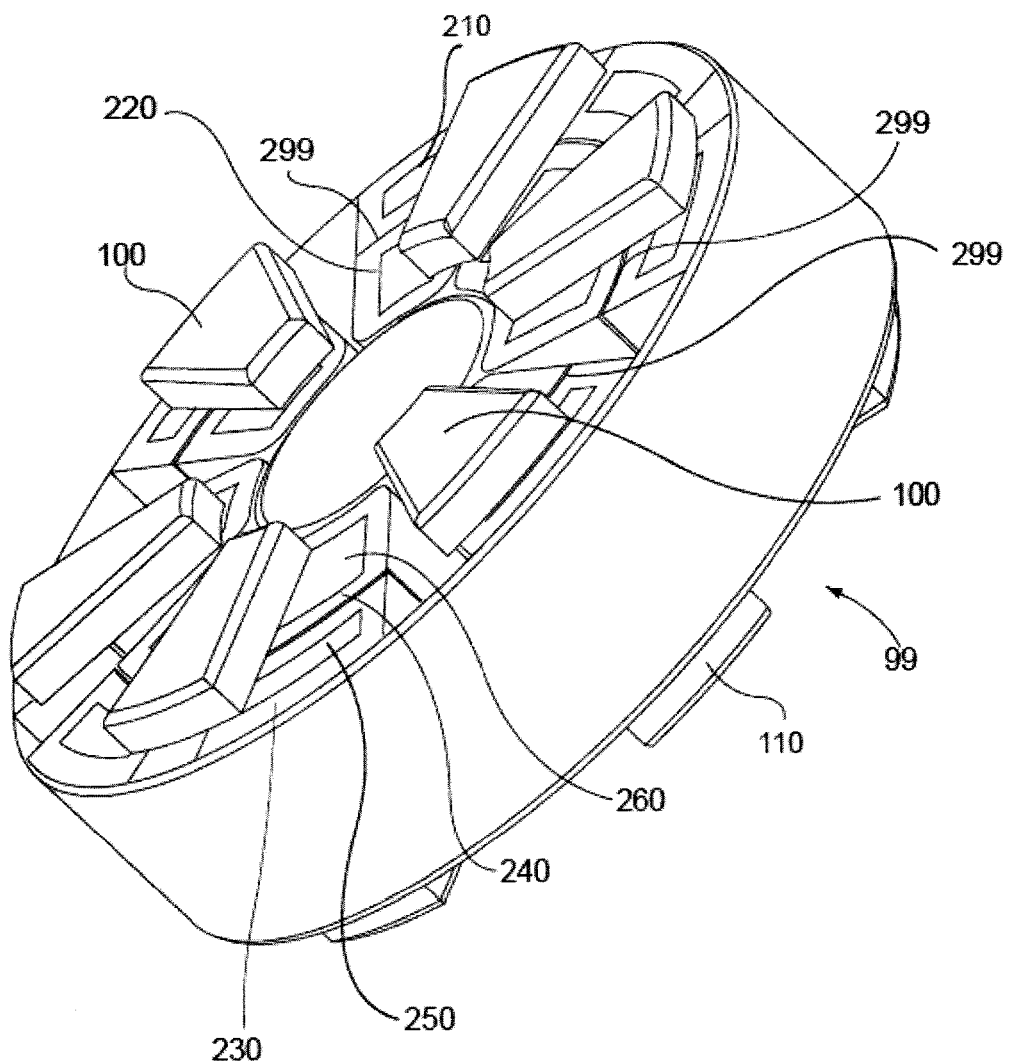
FIG. 4 is an alternate perspective view of one possible configuration of the motor of FIG. 3, according to non-limiting implementations.

FIG. 3 and FIG. 4 each depict perspective views of non-limiting implementations of an axial-flux reluctance motor 99, according to non-limiting implementations. The motor 99 comprises a plurality of stator poles 299 and a plurality of rotor poles 199, where each of the plurality of stator poles 299 and the plurality of rotor poles 199 are arranged radially, with the plurality of rotor poles 199 configured to rotate across the plurality of stator poles 299. Each of the plurality of rotor poles 199 comprises a first rotor pole component 100 and a second rotor pole component 110 (shown in FIG. 4) disposed on opposite sides of the plurality of stator poles 299. In other words, rotor pole components 100, 110 are generally in a one-to-one relationship, on opposite sides of the plurality of stator poles 299. Each of the stator poles 299 comprises at least two sub-poles, 210 and 220, arranged such that at least a portion of magnetic flux from a first sub-pole 210 flows through the first rotor pole component 100, through a second sub-pole 220, through the second rotor pole component 110 and back through the first sub-pole 210, as the plurality of rotor poles 199 rotate with respect to the plurality of stator poles 299.

In particular, non-limiting implementations of the motor 99 shown in FIGS. 3 and 4 can comprise multiple pole sets comprising eight stator poles 299 and six rotor poles 199.

Such implementations provide a motor 99 that is self-starting, and that is also of the switching type as all six rotor poles 199 are not simultaneously aligned with the eight stator poles 299. Put another way, each stator pole 299 is broken or split into a plurality of sub-poles, 210 and 220. While only two sub-poles, 210 and 220, are shown, in some embodiments a stator pole can be broken into three or more sub-poles. Each sub-pole can comprise a core component. In the example stator poles 299 shown in FIGS. 3 and 4, sub-pole 210 comprises core component 250 and sub-pole 220 comprises core component 260.

In a given stator pole with a plurality of sub-poles, at least one of the plurality of sub-pole core components can have a pole winding. In some embodiments, a plurality or all of the core components can have pole windings. In the example stator poles 299 shown in FIGS. 3 and 4, core component 250 can have pole winding 230 and core component 260 can have pole winding 240. The core components 250, 260 and pole windings 230, 240 can be arranged such that at least some magnetic flux passes from one sub-pole, 210 or 220, to the next, via at least one of the rotor poles 199, as the rotor poles 199 are rotating past the stator poles 299. In the configuration shown, magnetic flux passes from one sub-pole, 210 or 220, to the next sub-pole, 210 or 220, via at least one of the rotor poles 199, in a radial arrangement whereby the magnetic flux appears to be configured in a loop of a variable shape. In this configuration, the polarity of each pole is generally fixed, and under ideal operating conditions the motor 99 generally avoids changing the polarity of any of the poles. Under actual operating conditions, however, transient polarity changes may rarely occur.

Figure 5:
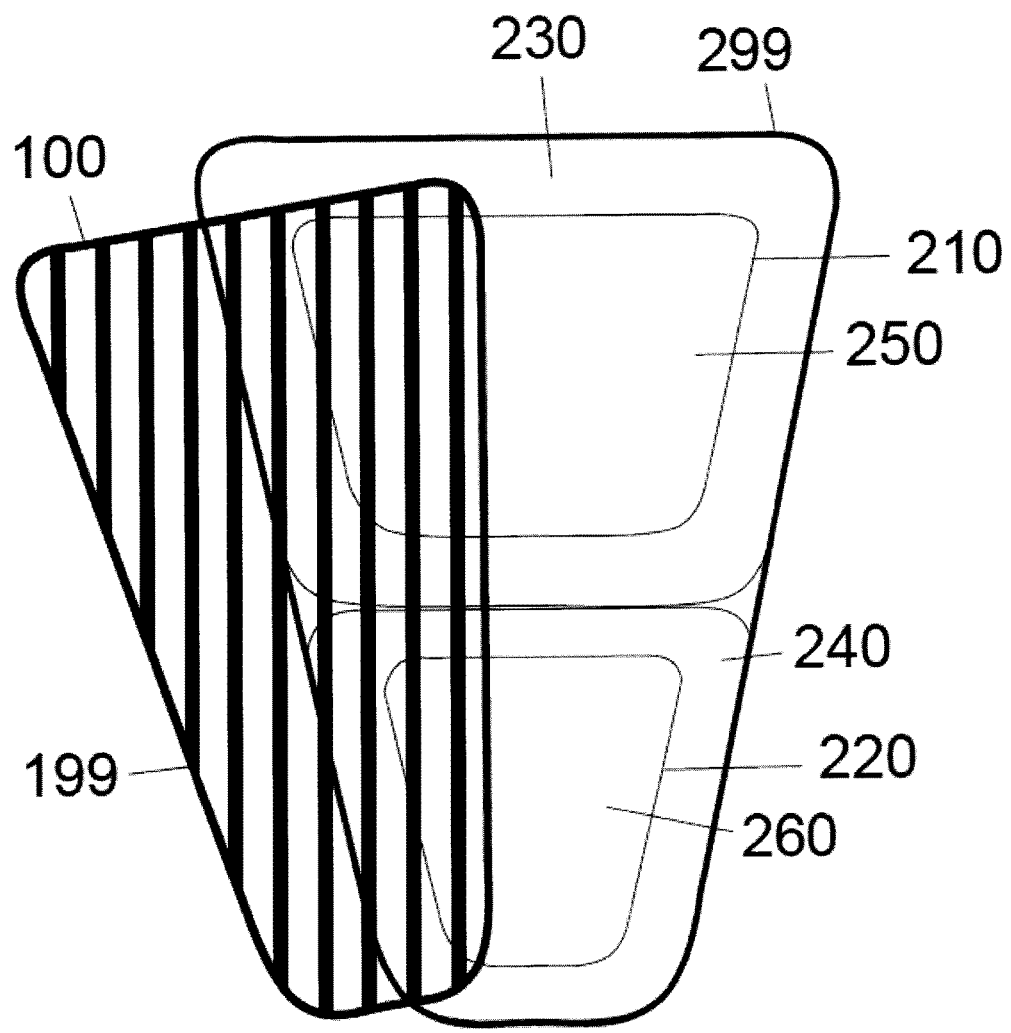
FIG. 5 is a partial axial plan view of showing a rotor pole component and a stator pole that can comprise a part of the motor of FIG. 3, according to non-limiting implementations.

FIG. 5 depicts a portion of one possible configuration of the motor 99 of FIGS. 3 and 4, comprised of one rotor pole component 100 that is offset from one stator pole 299 by an angular quantity, for example as the one rotor pole component 100 in FIG. 5 is rotating relative to the one stator pole 299 in FIG. 5. The angular quantity is dependent on the number of rotor poles 199, the number of stator poles 299, the angular arc of the stator poles 299, and the angular arc of the rotor poles 199, where arc refers to the length measured in, for example, degrees or radians, along a path which is concentric with the plurality of stator poles 299. Thus, the arc length of a stator pole 299 or a rotor pole component 100 will generally, in a given motor, be smaller if that motor possesses a larger number of poles. Any suitable number of rotor poles 199 or stator poles 299 is within the scope of the non-limiting implementations discussed herein.

While not depicted in FIG. 5, it is appreciated that a rotor pole component 110, corresponding to rotor pole component 100, is located on an opposite side of the stator pole 299 from rotor pole component 100, the rotor pole component 110 being located at about the same angular position of the first rotor pole component 100, and on the opposite side of the stator pole 299. In general, each rotor pole component 100 can have a corresponding rotor pole component 110 located on an opposite side of the plurality of stator poles 299. Each stator pole 299 comprises at least two sub-poles, 210 and 220, which are arranged such that both sub-poles, 210 and 220, are overlapped by both rotor pole components, 100 and 110, in the arrangement shown. Any suitable number of sub-poles can be used which fit inside the motor dimensions, and that also result in the flow of magnetic flux through the sub-poles, and rotor poles, and that also prevent changing of polarity of the sub-poles.

Figure 6:
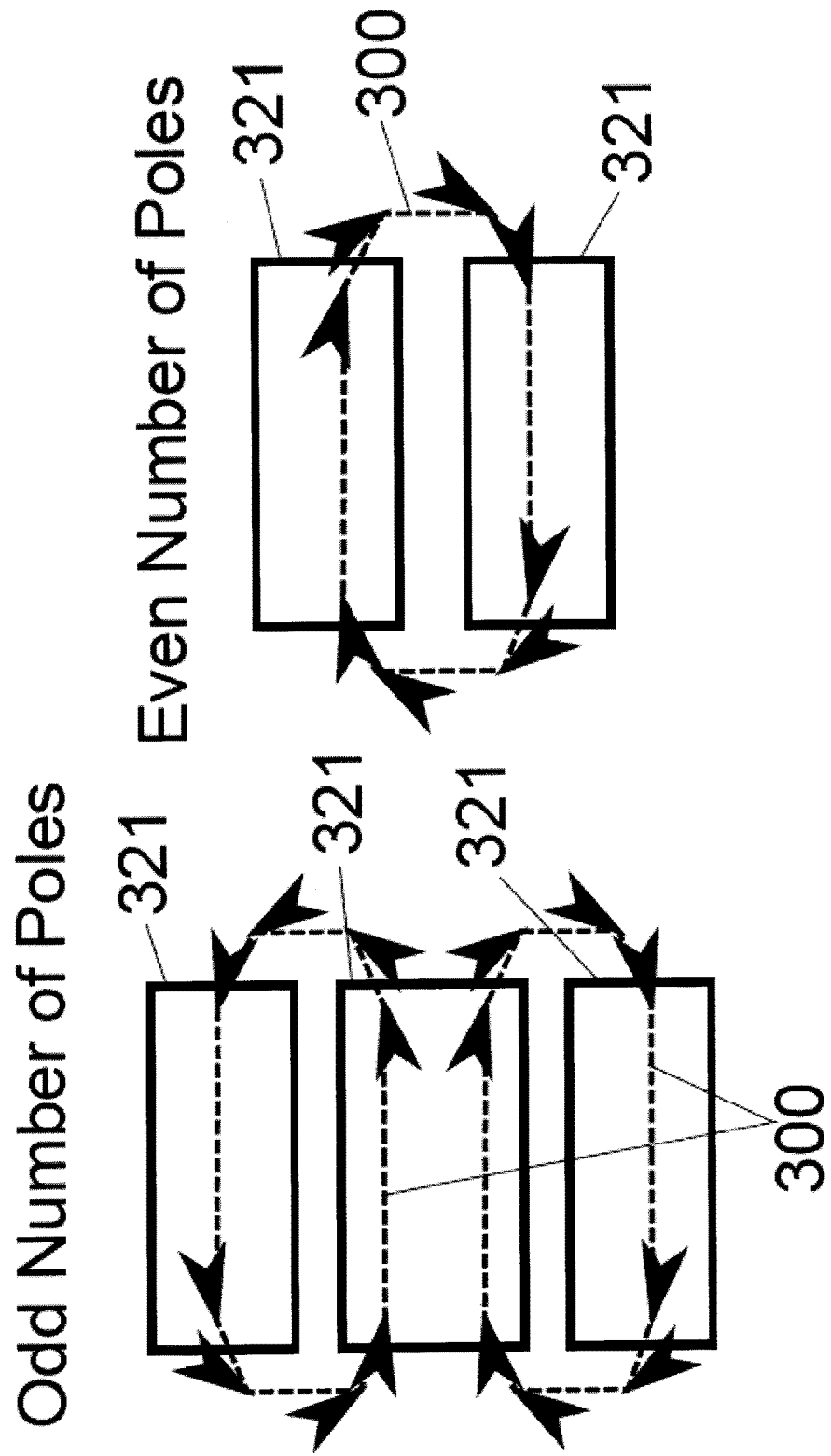
FIG. 6 is a tangential view of two possible configurations of the stator sub-poles of the motor of FIG. 3, along the direction of motion, according to non-limiting implementations.

In some non-limiting implementations, a number of sub-poles 321 can be an even number, as shown in the right hand side of FIG. 6, where magnetic flux 300 from one rotor sub-pole 321 can flow in one loop which flows in one direction. In other non-limiting implementations, a number of sub-poles 321 can be an odd number, as shown in the left hand side of FIG. 6, where magnetic flux 300 from one rotor sub-pole 321 can flow in multiple loops which can flow in opposite directions. Such multiple loops can be formed by three stator sub-poles 321, where the three sub-poles 321 can be arranged in the sub-pole 321 direction, and the magnetic flux 300 which flows through those sub-poles 321 passes in one direction through the middle sub-pole 321, and in the opposite direction through the top and bottom sub-poles 321. Such multiple loops can also be formed by a larger number of sub-poles.

The rotor pole components, 100 and 110, can possess a surface area that is about the same as, less than, or greater than the total surface area of the stator sub-poles, 210 and 220 (shown for example in FIG. 5). The configuration can permit the lower or upper edges of the rotor 199 and stator poles 299 to align at a plurality of angular offsets around the axis of rotation. The excess of surface area can also be used to ensure that the overlap of the rotor pole components, 100 and 110, is complete even when the rotor pole components, 100 and 110, are shifted vertically or horizontally. One result of this excess is to reduce the force along the direction in which magnetic flux flows, the force being that developed in the motor 99 and in each pole when a displacement occurs in the direction of the magnetic flux, or in the direction tangential to the direction of motion.

Figure 7:
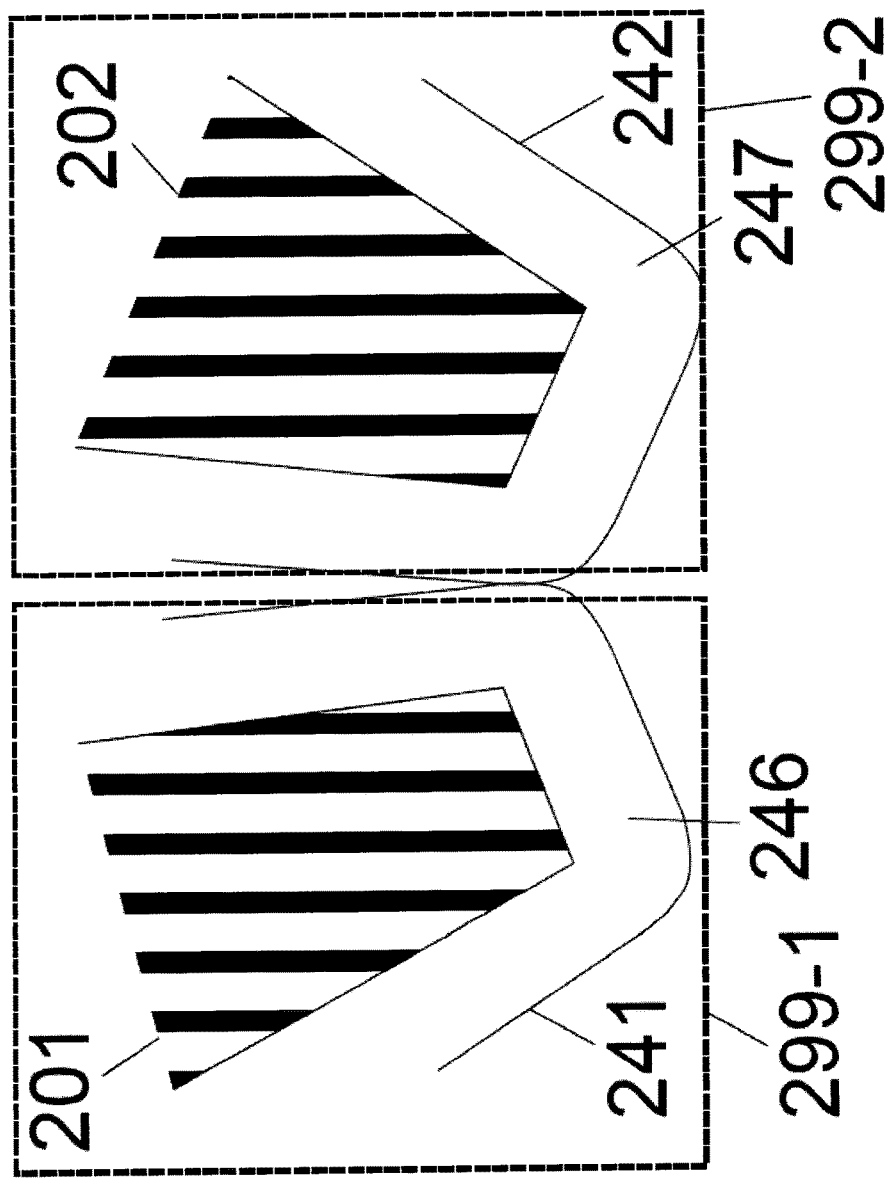
FIG. 7 is a partial axial view of a contact point between two windings on the lower edge of the two stator poles, comprising separate active components of the motor of FIG. 3, according to non-limiting implementations.

FIG. 7 shows the edges, 241 and 242, of two lower stator sub-pole windings, 246 and 247 of two different stator poles, 299-1 and 299-2, located on the interior surface of the motor 99 in one possible configuration, wherein the pole windings, 246 and 247, are shown to be placed around the core components, 201 and 202, of the stator poles 299-1 and 299-2. The term 'core components' refers to any of the objects around which conductive elements are placed, or through which magnetic flux is intended to flow, and the term 'pole windings' refers to those conductive elements, which can include, but are not limited to, copper wires. The corners of the windings, 246 and 247, in FIG. 7 are shown to be curved, where the degree of pole winding curvature can be set in a plurality of increments. A plurality of other configurations are possible where the windings, 246 and 247, are woven, or arranged around a different direction. Furthermore, the core components, 201, and 202, can be produced in a variety of shapes that follow or diverge from the shape of the winding, and the winding, 246 or 247, can be composed of a plurality of wires, bars, or conductive materials. The winding curvature, when implemented, permits the lower radial edges, 241 and 242, of the stator poles 299-1 and 299-2 to be closer to the axis of rotation than they would be if the pole windings, 246 and 247, had a square edge, thereby increasing the size of the stator poles 299-1 and 299-2 in the radial direction. Thus, winding curvature can be an optional feature in the various implementations of the motor 99.

Figure 8:
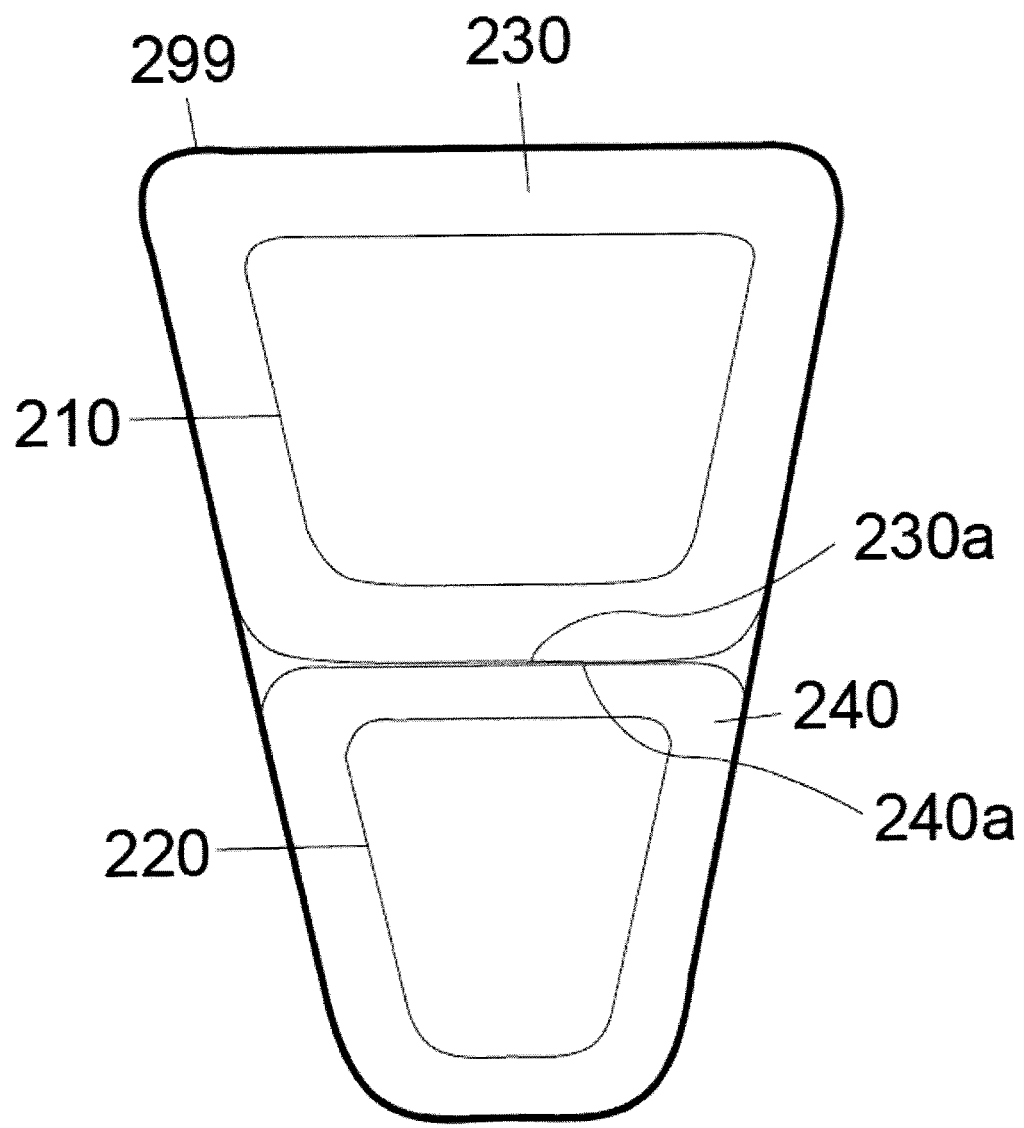
FIG. 8 is an axial view of a single stator pole that can comprise one active part of the motor of FIG. 3, according to non-limiting implementations.

FIG. 8 shows a non-limiting implementation of a single stator pole 299 consisting of two sub-poles, 210 and 220. In particular, stator pole 299 is segmented in the sub-pole direction and hence comprises a segmented shape in the sub-pole direction. The sub-poles, 210 and 220, are arranged such that at least a portion of surface 240a of the pole winding 240 can be in contact with at least a portion of surface 230a of the pole winding 230, and that the core components of the two sub-poles, 210 and 220, are placed within each of the windings, 230 and 240. The total size of each sub-pole, 210 can be about geometrically equal to the size of sub-pole 220, along a variety of dimensions that can vary with the motor design. For example, the area of the portion of stator sub-pole 210 visible in FIG. 8, can be about equal to the area of the portion of stator sub-pole 220 visible in FIG. 8. The shape of each sub-pole 210, for example the radial shape, can be different or similar to the shape of sub-poles 220. In the configuration shown in FIG. 8, an important dimension considered by the designer can be the radial length of the two sub-poles, 210 and 220, and the rotor pole components, 100 and 110. Other configurations can be created in which one of the pole winding 240 or the pole winding 230 is not present, and in these configurations the sub-poles 210 and 220 can also be determined such that they are of equal geometric area.

FIG. 9 shows front and back views of a stator pole 299, showing rotor pole components 100 and 110 respectively. FIG. 9 depicts a path 300 of the magnetic flux passing from the surface of the rotor pole component 100 to the surface of the stator pole 299. The magnetic flux can flow in either direction along the path 300, or along a plurality of similar paths that pass from the surface of the upper stator sub-pole 210 to the depicted rotor pole component 100, back through the lower stator sub-pole 220, up through the rotor pole component 110, and back through the upper stator sub-pole 210. In general, any path of magnetic flux that produces a magnetomotive force (i.e. a rotating force) on the plurality of rotor poles 199 is within the scope of present implementations.

In depicted implementations, path 300 is shown to leave the upper stator sub-pole 210 on the axial surface 315, but can also leave the sub-pole 210 on the radial surface, entering the surface 320 of the rotor pole component 100 which is perpendicular to the direction of motion or the axial surface of the rotor pole component 100, and exiting through the same surface 325 or a different surface of the rotor pole component 100. The path then enters the axial surface 330, or another surface of the lower stator sub-pole 220, and continues to exit the lower stator sub-pole 220 on the reverse side 330a of the sub-pole 220. The path 300 then enters the rotor pole component 110 in the same manner as it does the rotor pole component 100. Path 300 can enter rotor pole component 110 through surface 325a and can exit through surface 320a. Path 300 can then enter surface 315a of the upper stator sub-pole 210 in the same manner that it exits the axial surface 315 the upper stator sub-pole 210. In this manner path 300 can form a closed loop passing through stator sub-poles 210 and 220 and rotor pole components 100 and 110.

Surfaces 320a and 325a can be at locations on rotor pole component 110 that are the same as or different than the locations of surfaces 320 and 325 on rotor pole component 100. Moreover, surfaces 320 and 325 can be located at locations on rotor pole component 100 different than those locations shown in FIG. 9. Similarly, surfaces 320a and 325a can be located at locations on rotor pole component 110 different than those locations shown in FIG. 9. Surfaces 315 and 330 can be at locations on one side of stator pole 299 that are the same as or different than the locations of surfaces 315a and 330a on the opposite side of stator pole 299. Surfaces 315, 315a, 330, and 330a can be located at locations on stator pole 299 different than those shown in FIG. 9. The distribution of this magnetic flux is dependent on both the total magnetomotive force that produces the magnetic flux, and on the materials through which it passes. The combination of material composition, magnetic permeability, device geometry, and magnetomotive force gives an indication of the shape of the magnetic flux flow, as shown.

The dimensions of the rotor poles 199, including rotor pole components 100 and 110, and the dimensions of the stator poles 299 are therefore dependent on the material used in the core components, 250 and 260, of the motor 99, as shown in FIG. 3. For example, some materials may saturate at lower magnetic flux densities, requiring the core components 250 and 260 to have larger cross-sectional areas. Other core component materials may affect the shape of path 300 in other ways. The shape of core components can be configured to accommodate the shape of path 300. The dimensions of the motor 99 and of its components can thus be selected to produce the magnetic flux flow shape that will result in the maximum device performance or best device characteristics. These characteristics can include, but are not limited to, power density, torque density, device mass, component mass, efficiency, and device cost. Materials used in core components 250, 260 can include, but are not limited to, powder metals, composite laminates, magnetic steel laminations, amorphous metals, and solid ferromagnetic metals.

Figure 10:
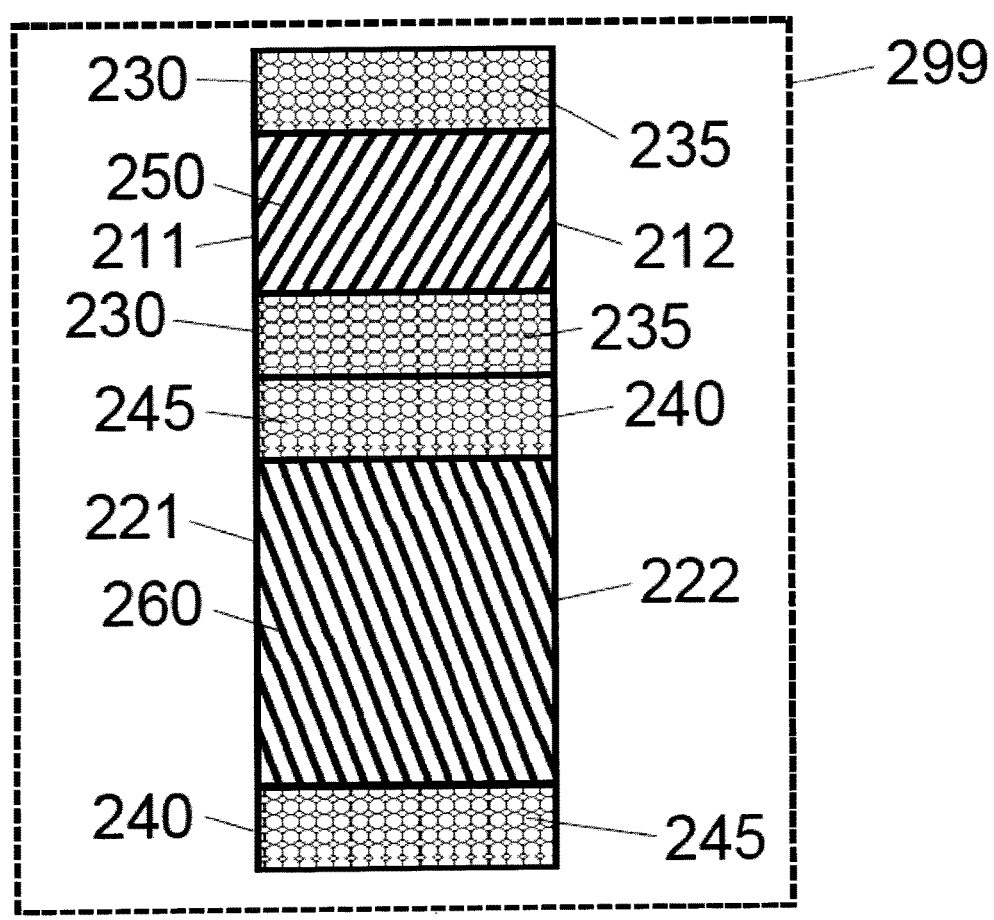
FIG. 10 is a tangential view of a stator pole of the motor of FIG. 3 along the direction of motion, according to non-limiting implementations.

FIG. 10 shows a radial cross-section of a possible pole winding configuration on a stator pole 299. The axial edges of the stator sub-poles, 211, 212, 221, and 222, are shown to be flat. The pole windings, 230 and 240, are composed of a plurality of components 235 and 245, which can comprise wires, bars, or other conductors, in an arrangement which produces magnetic flux in the axial direction. The size and shape of each component of the pole winding, 235 or 245, which as shown can be copper wires with circular cross-sections, can be chosen to result in a plurality of pole winding configurations. The pole winding, 230 or 240, is configured to fill the space available inside the motor 99 for each stator pole 299, where in FIG. 10 the winding configuration is selected to occupy about a maximum space inside the motor 99, subject to the stipulation that the dimensions of the each stator pole 299 are about equal, and the stipulation that the size of the pole winding, 230 or 240, will produce the device characteristics in which a balance between the size of the winding, 230 or 240, and the size of the core components, 250 and 260, is reached. This balance can result in the total volume of the pole windings, 230 and 240, for each stator pole 299 being less than, about equal to, or more than the total volume of the core components, 250 or 260, in that stator pole.

Figure 11:
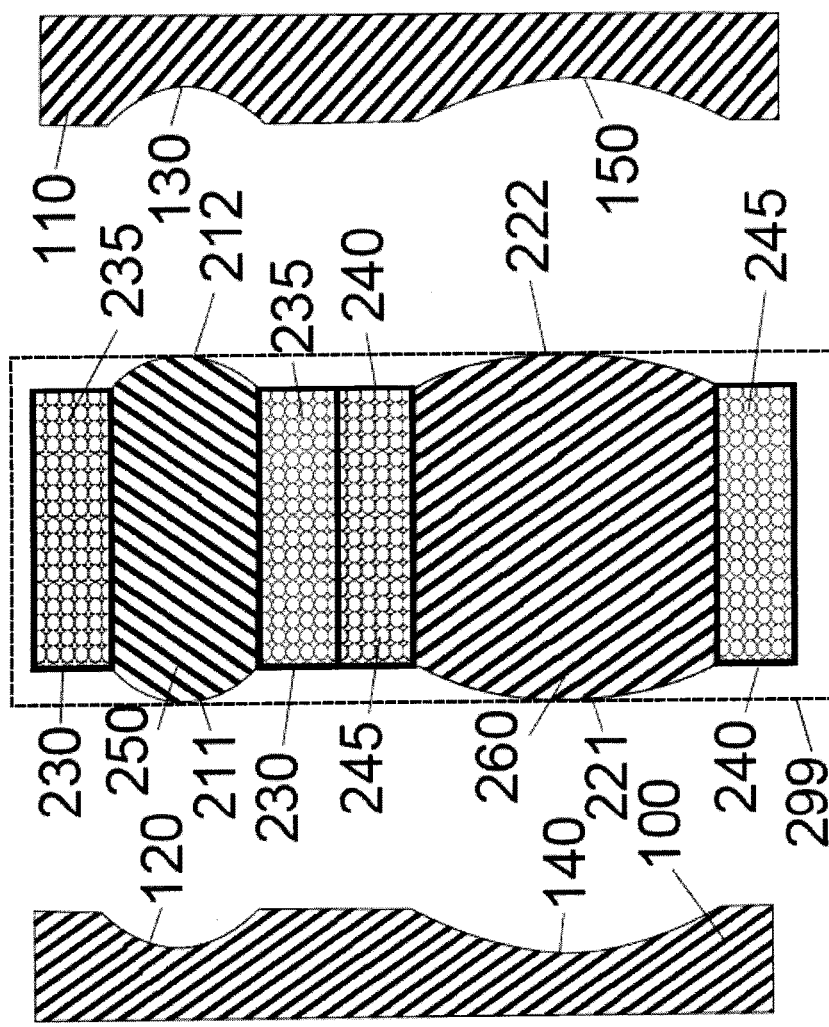
FIG. 11 is a tangential view of a stator and rotor pole of the motor of FIG. 3, along the direction of motion, including two rotor pole components and one stator pole, according to non-limiting implementations; the rotor pole components are shown separated from the stator pole by a gap that is larger than would be used in an actual device.
Figure 12:
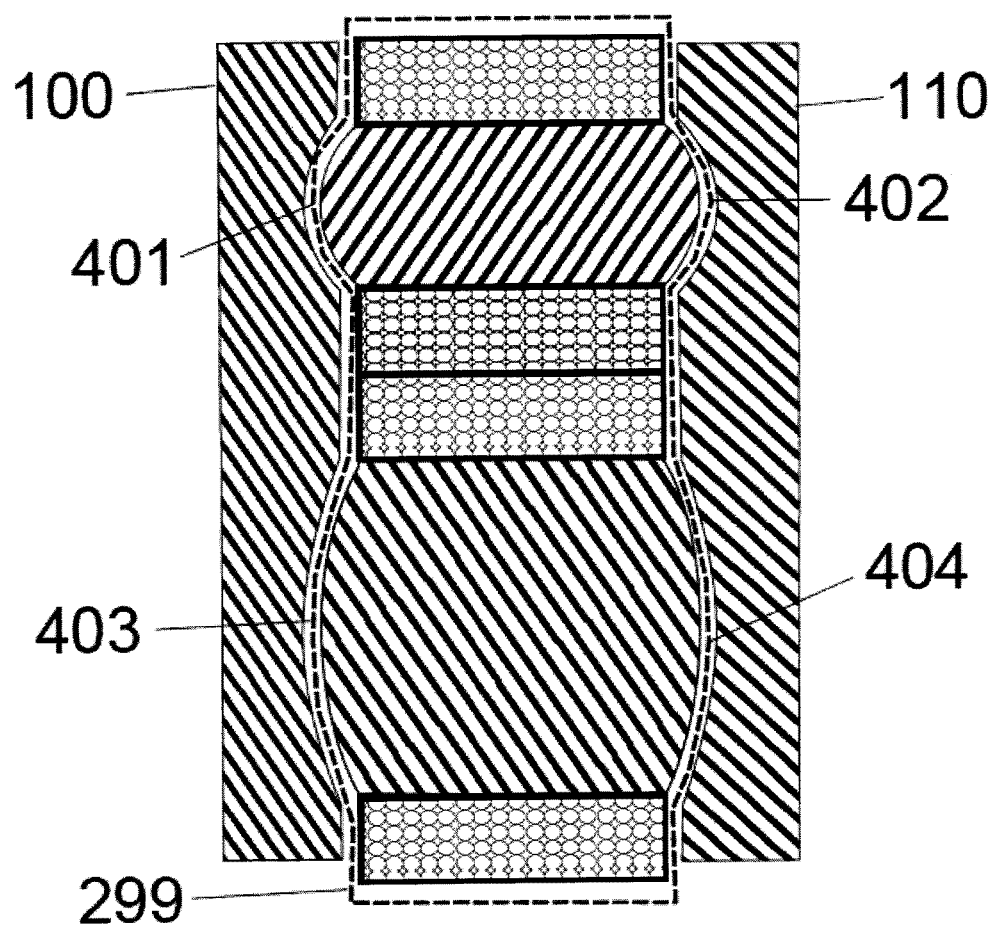
FIG. 12 is a tangential view of a pole of the motor of FIG. 3, along the direction of motion, including two rotor pole components and one stator pole, according to non-limiting implementations; the rotor pole components are shown in a configuration that can resemble an actual device.

FIG. 11 and FIG. 12 show a cross section of one possible configuration of a stator pole 299. FIG. 11 shows one possible configuration in which the rotor pole components 100 and 110, are separated from the stator pole 299 for illustration purposes only. This configuration is used to show where the poles fit together, while maintaining labels on each part. The parts shown include the pole winding 230, the conductive parts of the pole winding 235, the pole winding 240, the conductive parts of the pole winding 245, the pole core components 250 and the pole core components 260.

FIG. 12 shows one possible configuration in which the rotor pole components, 100 and 110, are placed adjacent the stator pole 299. This configuration is used to show the method in which the poles fit together in more detail than the configuration in FIG. 11, and to show the shape of the gaps, 401, 402, 403, and 404, between the poles. Thus, both FIG. 11 and FIG. 12 show the same set of parts. The edges of the cross-section, 120, 130, 140, 150, 211, 212, 221, and 222, can be altered to possess a plurality of shapes such that the gaps, 401, 402, 403, and 404, between the rotor pole components, 100 and 110, and stator pole 299 can also possess a plurality of shapes.

FIG. 11 and FIG. 12 show a configuration in which the stator 299 and rotor pole components 100 and 110, possess a semi-circular or ovular shape on their axial edges. Such a configuration increases the length of the overlap between the rotor 199 and stator poles 299 in the axial view along the radial direction, such that a larger quantity of magnetic flux is permitted to pass across the airgap when the rotor pole components 100 and 110, and stator pole 299 shown in the figures are rotated relative to each other about the motor's main axis of rotation.

While not depicted, it is further appreciated that each of the plurality of stator poles 299 and the plurality of rotor poles 199, as described herein, can comprise one or more of: a segmented shape along the sub-pole direction producing a segmented interface between the plurality of stator poles 299 and the plurality of rotor poles 199; and, a toothed shape along the sub-pole direction producing a toothed interface between the plurality of stator poles 299 and the plurality of rotor poles 199.

Figure 13:
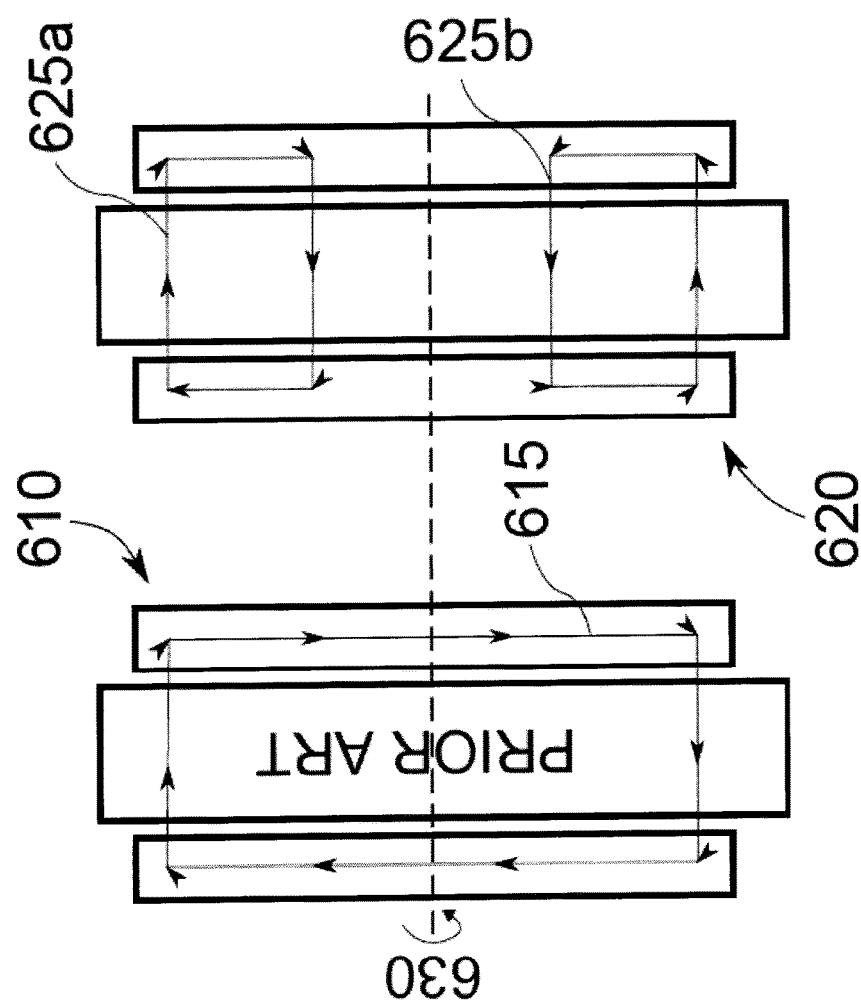
FIG. 13 is a comparison between the magnetic flux paths of the prior art motor and a present implementation of the motor of FIG. 3 discussed herein, where the present motor is shown with two sub-poles per stator pole, according to non-limiting implementations.

FIG. 13 shows the configuration of the magnetic flux in both a prior art motor 610 (left hand side of FIG. 13) and in one non-limiting present configuration 620 of motor 99 described herein (right hand side of FIG. 13). The prior art motor's magnetic flux 615 either crosses the axis of rotation 630, or moves along the direction of motion. In non-limiting configuration 620, the present motor's 99 magnetic flux, 625a and 625b, moves along the radial and axial directions, such that the direction of the magnetic flux loop does not reverse while motor 99 is active. This reduces the losses due to magnetic hysteresis, where the magnetization of the core components in the prior art motor is forced to change once every time that a pole is activated. The present motor 620 can contain anhysteretic, or semi-anhysteretic paired-pole phases, while the prior art motor 610 can contain one conjugate-pole phase.

Figure 14:
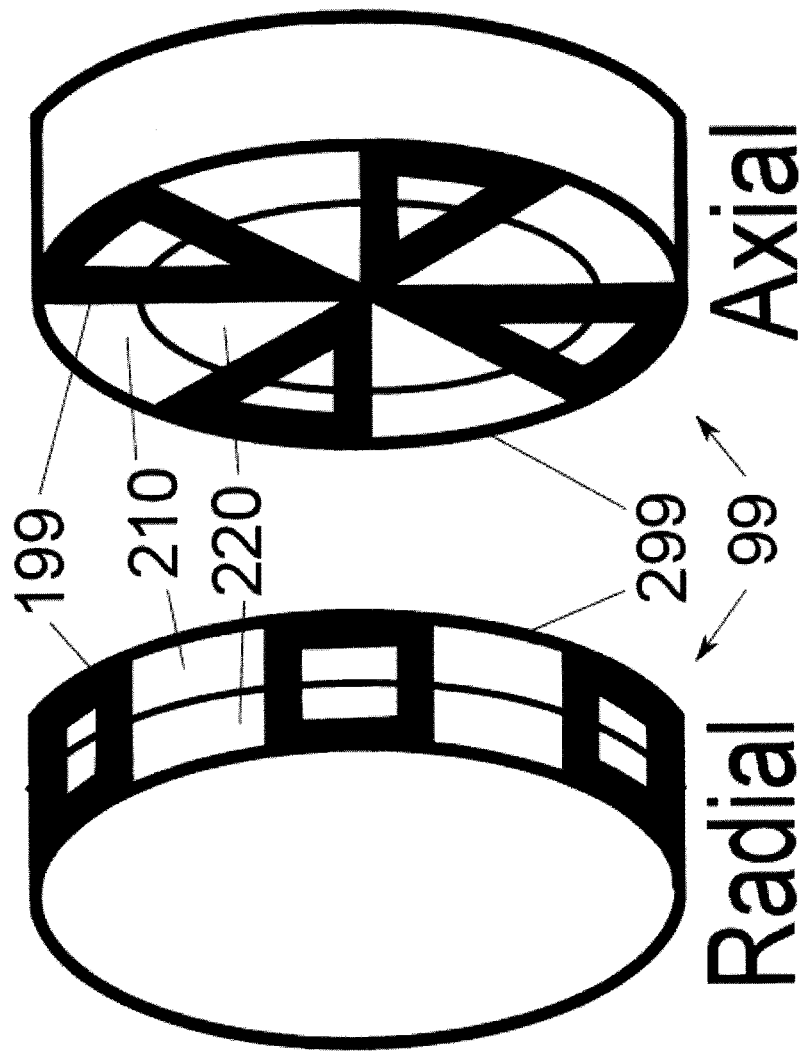
FIG. 14 is a comparison of radial and axial configurations of present implementations of the motor of FIG. 3 discussed herein, where the rotor poles are indicated by darkened areas, according to non-limiting implementations.

FIG. 14 shows two possible motor configurations of a motor 99 as described herein. The motor 99 can be configured such that the rotor poles 199 and stator poles 299 are radially concentric, or arranged along the radial direction (left half of FIG. 14), with the direction of magnetic flux in the radial direction, and the stator sub-poles, 210 and 220, arranged along the axial direction. The motor 99 can also be configured such that the rotor poles 199 and stator poles 299 are arranged along the axial direction, with the stator sub-poles, 210 and 220, arranged in the radial direction, or arranged such that one stator sub-pole, 210 or 220, is located on top of another sub-pole, 210 or 220, outward from the center of the motor 99. Thus, the stator sub-poles, 210 and 220, can be configured such that the sub-poles, 210 and 220, are arranged along a direction which is perpendicular to the direction of motion, and which is perpendicular to the direction of the magnetic flux flow through the core components. The configuration of the motor 99 can be selected depending on the geometry of the outer boundaries for the motor application. The radial configuration can be used when the axial depth is to be large compared to the radial length, and the axial configuration can be used when the radial length is to be large compared to the axial depth, as the performance of a motor is dependent on the surface area of that motor's poles.

Figure 15:
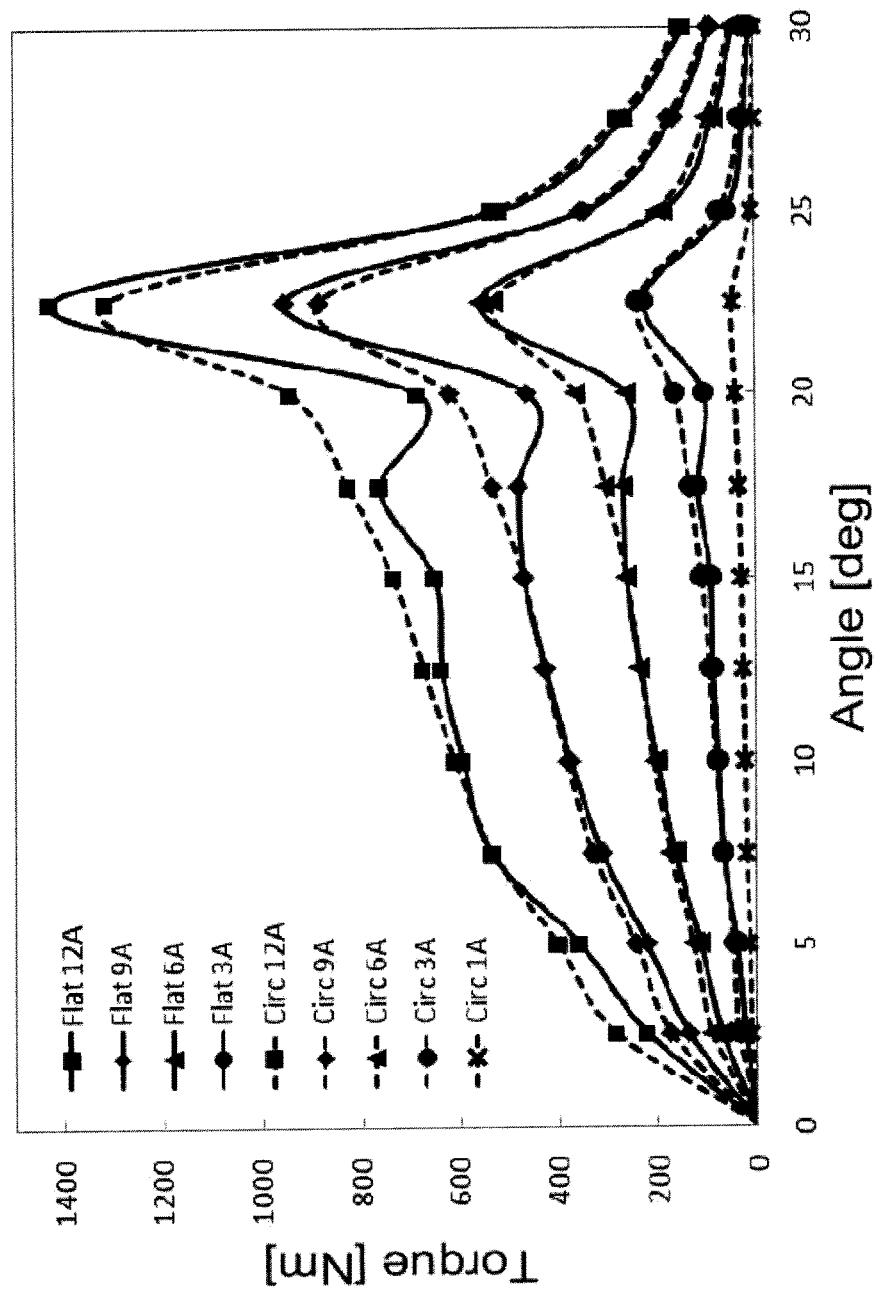
FIG. 15 is a performance comparison between two possible implementations of the motor of FIG. 3, having flat and curved interfaces between the rotor and stator pole surfaces, according to non-limiting implementations. The curves in the figure correspond to the stator pole shape which produces a flat interface between the plurality of stator poles and the plurality of rotor poles are indicated by the word 'Flat', and the curves in the figure corresponding to the stator pole shape which produces a curved interface between the plurality of stator poles and the plurality of rotor poles are indicated by the word 'Circ'. The figure has a vertical axis with units of Newton-meters to describe torque, and a horizontal axis with units of degrees to describe the rotation angle from the aligned position, where a rotor pole and a stator pole are completely overlapped, according to non-limiting implementations.

FIG. 15 shows the torque produced by a present implementation of a motor 99 shown in FIGS. 3 and 4, and described herein. The torque is compared between two configurations, the first of which has flat pole surfaces 211, 212, 221, and 222, as in FIG. 10 (e.g. a flat radial shape), and the second of which has curved pole surfaces, 120, 130, 140, 150, 211, 212, 221, and 222, as in FIG. 11 (e.g. a curved radial shape). In FIG. 15, the term 'Flat' refers to the set of profiles with high peaks, and irregular shapes, shown using solid lines, and the term 'Circ' refers to the set of profiles with lower peaks and smoother shapes, shown using dashed lines. The current levels of each line are tracked using markers, which are square, diamond-shaped, triangular, circular, and x-shaped, for the profiles in which 12 ampere, 9 ampere, 6 ampere, and 3 ampere currents are present in the motor windings, 230 and 240, respectively. For the curved pole surfaces, the degree of curvature can be varied to change the pole surface area. The curved poles have a larger surface area, and thus produce more torque, more of the time. This is why near 20 degrees on the x-axis, Flat 12A is lower than Circ 12A, Flat 9A is lower than Circ 9A, Flat 6A is lower than Circ 6A, and Flat 3A is lower than Circ 3A. Circ 1A is the lowest because it corresponds to the situation when the motor has the least current in the windings. However, the curved poles have a lower magnetic flux density when the rotor poles 199 and stator poles 299 have a very small amount of overlap, reducing the peak torque near 22.5 degrees. The amount of pole curvature can be chosen depending on the number of poles in the motor 99, and the amount of variation in the output torque that is allowable in an application.

Figure 16:
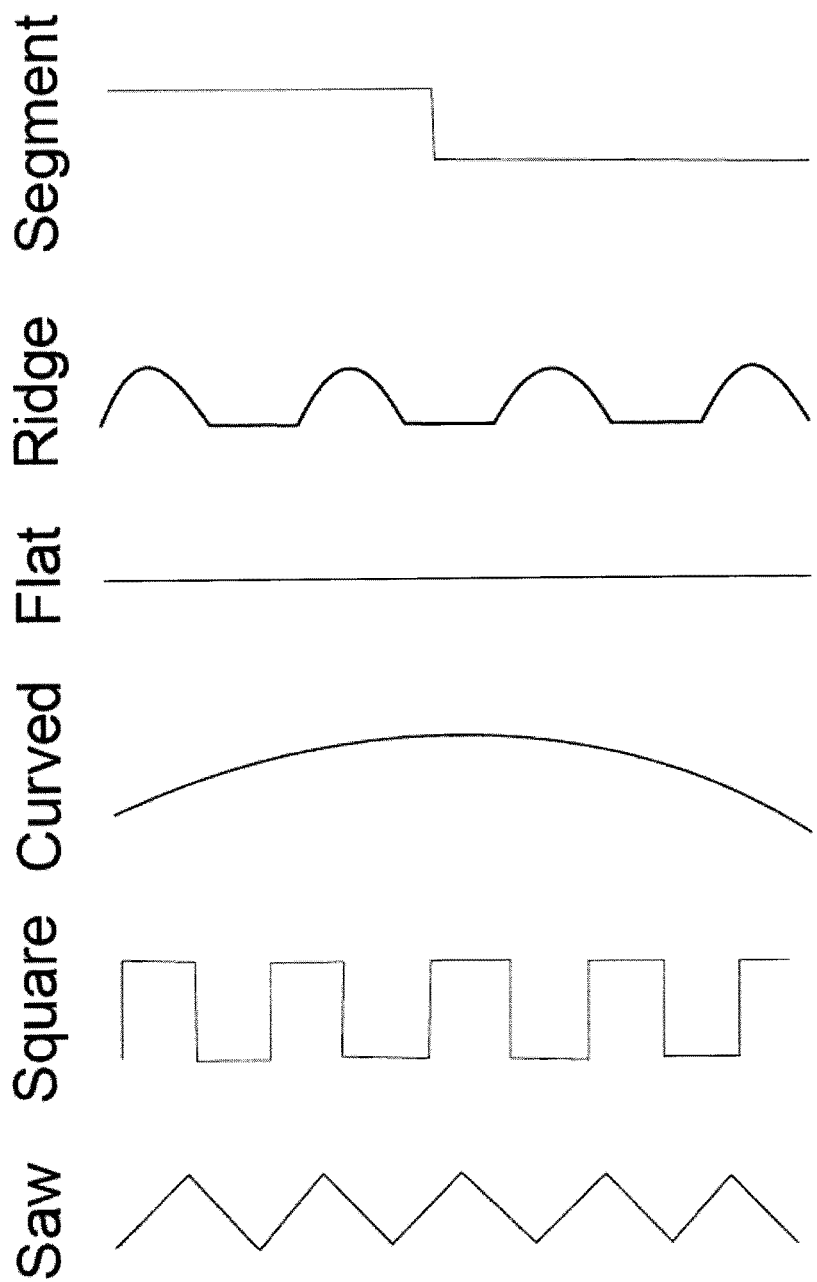
FIG. 16 is a tangential view of six curves which can correspond to configurations of the motor of FIG. 3, where the curves can correspond to the shape of the interface between the plurality of stator poles and the plurality of rotor poles, according to non-limiting implementations.

FIG. 16 shows several shapes which can represent the shape of the pole surfaces, 120, 130, 140, 150, 211, 212, 221, and 222, (as shown in FIG. 11) in non-limiting implementations. The shapes corresponding to the labels 'Saw', 'Square', and 'Ridge' can be referred to as 'toothed', and the shape corresponding to the label 'Curved' can be referred to as 'curved'. Further, the shape corresponding to the label 'Flat' can be referred to as 'flat', and the shape corresponding to the label 'Segment' can be referred to as 'segmented'. These shapes represent the profiles of the interface on the surface between the rotor poles 199 and the stator poles 299, along the sub-pole direction. Thus, as the rotor poles 199 rotate across the stator poles 299, each rotor pole component, 100 and 110, can pass across each stator pole 299. While a rotor pole component, 100 or 110, is present in a configuration in which that pole overlaps with a stator pole 299 in the view along the direction in which magnetic flux flows, the gaps, 401, 402, 403, and 404 (as shown in FIG. 12), between the rotor pole components, 100 or 110, and the stator pole 299 can possess a shape along the sub-pole direction which can be one of the shapes shown in FIG. 16.

Figure 17:
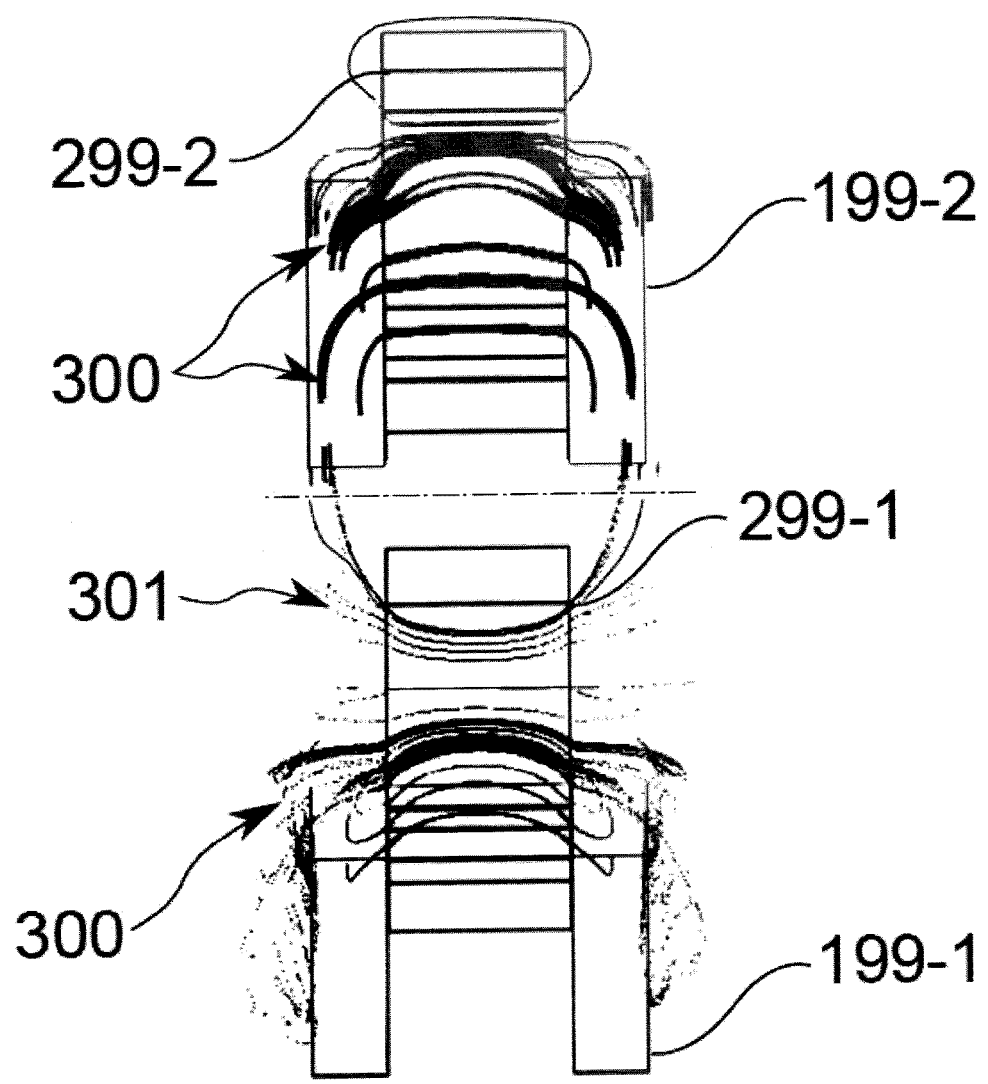
FIG. 17 is a visualization of one possible implementation of the motor of FIG. 3, shown in a top view. The magnetic flux is depicted as a set of variable-thickness lines, where two stator poles and four rotor pole components are visible in the diagram, according to non-limiting implementations.

FIG. 17 shows a computer model of the magnetic flux in an active pole in a present implementation of a motor 99 described herein. The model is shown from the top down, along the radial direction such that the deformed magnetic flux loop at the unaligned position is visible. The computer model shows that most of the magnetic flux is confined to a single motor pole, with very little magnetic flux leaking into a nearby pole. In more detail, two neighbouring rotor poles 199-1 and 199-2 are shown as they pass over neighbouring stator poles 299-1 and 299-2. It can be seen that the magnetic flux 300 which passes through one stator pole 299-1 or another stator pole 299-2, has a tendency to return to pass back through the same stator pole. Some magnetic flux 301 does, however, leak from one stator pole 299-1 through the rotor poles 199-2 which are near stator pole 299-1. The small amount of magnetic flux that can leak from each stator pole 299-1 and 299-2 shows that most of the flux 300 produced by each stator pole 299-1 and 299-2 is useful for the operation of the machine.

Figure 18:
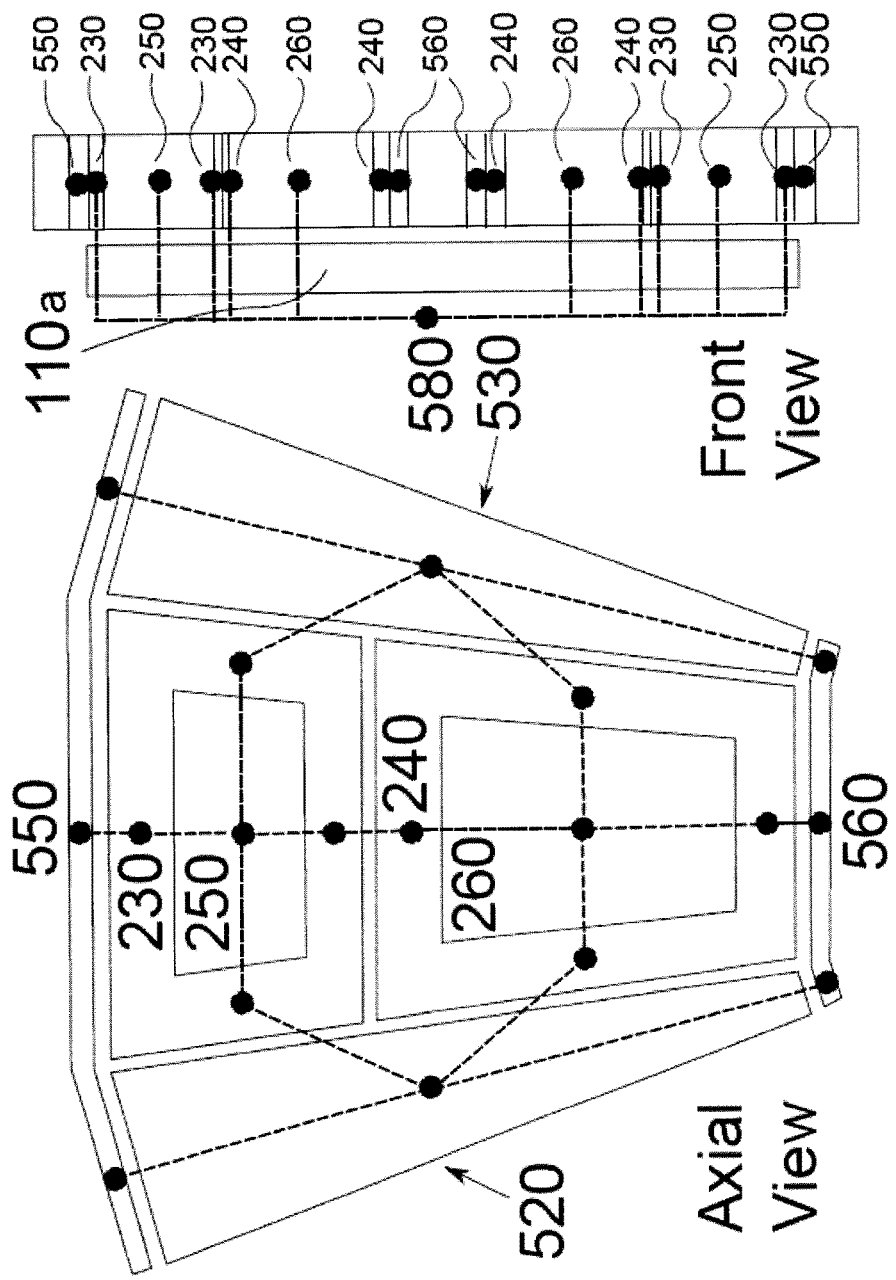
FIG. 18 depicts shows a schematic diagram of a cross-section of a portion of one possible implementation of the motor of FIG. 3, in a linear thermal circuit analysis, wherein the axial view shows one stator pole consisting of two sub-poles, and the front view shows two stator poles arranged on opposite sides of the axis of rotation.

FIG. 18 shows a schematic diagram of a cross-section of a portion of a specific non-limiting implementation of a motor 99 described herein. The diagram is arranged to show an equivalent thermal circuit for the motor 99, where the dashed lines show example heat flow paths. The thermal circuit is useful to consider because it shows where heat flows in the motor 99. FIG. 18 shows example heat flows in the case of a passive, air-cooled motor. The thermal circuit can be different in the case of alternate passive cooling schemes, for example using a solid heat sink, or active cooling for example using pumped liquid cooling.

The diagram also shows two partial views of the motor 99, an axial view along the axial direction, and a front view along the direction that is tangential to the direction of motion. The part of the diagram that is along the tangential direction shows the layers of the motor 99 that would be visible if a cross-section was cut along the diagonal, from one radial edge to the opposite radial edge. In the front view, the position 110a of one set of rotor pole components is shown, relative to the stator poles. The position of the second set of rotor pole components, on the side of the stator poles opposite the position 110a of rotor pole component, is not shown. The part of the diagram that is along the axial direction only shows a portion of the upper half of the motor 99 from the axis of rotation to one radial edge.

Heat can therefore flow from the previous stator pole separator 520 to the upper case 550, lower case 560, winding 230, or winding 240, and vice versa, or from the next stator pole separator 530 to the upper case 550, lower case 560, winding 230, or winding 240, and vice versa. Heat can also flow from the winding 230 to the upper case 550, the core 250, the next separator 530, or the winding 240 and vice versa, or from the winding 240 to the core 260, the lower case 560, or the next stator pole separator 530. Likewise, heat can flow from the next stator pole separator 530 to the upper case 550 and the lower case 560. All of the motor components can transmit heat to the ambient air 580.

It will be appreciated that still further embodiments of the present features and motor implementations will be apparent to those skilled in the art in view of the present disclosure. It is to be understood that the present features and motor implementations are by no means limited to the particular constructions herein disclosed and/or shown in the drawings, but also comprise any modifications or equivalents within the scope of the discussion herein.

The invention claimed is:

1. A switched reluctance motor comprising:
   a plurality of stator poles arranged along a circumferential direction of an axis of rotation, the axis of rotation defining an axial direction, a radial direction, and the circumferential direction; and,
   a plurality of rotor poles arranged along the circumferential direction, the plurality of rotor poles arranged along the axial direction with respect to the plurality of stator poles to rotate across the plurality of stator poles, each of the plurality of rotor poles comprising a first rotor pole component and a second rotor pole component disposed on opposite axial sides of the plurality of stator poles,
   each of the plurality of stator poles comprising at least a first sub-pole and a second sub-pole arranged along the radial direction from the first sub-pole such that at least a portion of magnetic flux from the first sub-pole flows radially through the first rotor pole component, axially through the second sub-pole, radially through the second rotor pole component and axially back through the first sub-pole, and,
   as the plurality of rotor poles rotate with respect to the plurality of stator poles, the magnetic flux exerting a rotating force on the plurality of rotor poles.

2. The switched reluctance motor of claim 1, wherein a number of each of the plurality of rotor poles and the plurality of stator poles is greater than or equal to two.

3. The switched reluctance motor of claim 1, wherein a number of each of the plurality of rotor poles and the plurality of stator poles is even.

4. The switched reluctance motor of claim 1, wherein a number of each of the plurality of rotor poles and the plurality of stator poles is odd.

5. The switched reluctance motor of claim 1, wherein a number of the plurality of stator poles is not equal to a respective number of the plurality of rotor poles.

6. The switched reluctance motor of claim 1, wherein a number of the plurality of stator poles is equal to a number of the plurality of rotor poles.

7. The switched reluctance motor of claim 1, further comprising a plurality of stator sub-poles, including the first sub-pole and the second sub-pole.

8. The switched reluctance motor of claim 7, wherein a number of the plurality of stator sub-poles is greater than two.

9. The switched reluctance motor of claim 7, wherein a number of the plurality of stator sub-poles is even.

10. The switched reluctance motor of claim 7, wherein a number of the plurality of stator sub-poles is odd.

11. The switched reluctance motor of claim 1, wherein a surface of each of the plurality of stator poles has a shape along a sub-pole direction configured to permit rotation of each of the first rotor pole component and the second rotor pole component disposed on opposite sides of the plurality of stator poles.

12. The switched reluctance motor of claim 1, wherein a surface of each of the plurality of rotor poles has a shape along a sub-pole direction corresponding to a respective shape of a respective surface of the plurality of stator poles, along the sub-pole direction, to form an interface between the plurality of rotor poles and the plurality of stator poles.

13. The switched reluctance motor of claim 1, wherein each of the plurality of stator poles and the plurality of rotor poles comprises
   a curved shape along a sub-pole direction producing a curved interface between the plurality of stator poles and the plurality of rotor poles.

14. The switched reluctance motor of claim 1, wherein each of the plurality of rotor poles comprises a surface area less than, equal to, or greater than a respective surface area of each of the plurality of stator poles.

15. The switched reluctance motor of claim 1, wherein the plurality of rotor poles are arranged such that at least some overlap occurs with the plurality of stator poles, regardless of a rotational position of the plurality of rotor poles with respect to the plurality of stator poles.

16. The switched reluctance motor of claim 1, wherein each of the first sub-pole and the second sub-pole of each of the plurality of stator poles comprises a core component and a winding.

17. The switched reluctance motor of claim 1, wherein a first rotor pole component of the plurality of rotor poles possesses a surface area that is greater than a surface area of a first stator pole of the plurality of stator poles such that a displacement of the first rotor pole along the radial direction does not affect a total overlap of the first rotor pole with the first stator pole.

18. The switched reluctance motor of claim 1, wherein a first rotor pole component of the plurality of rotor poles possesses a surface area that is about the same as a surface area of a first stator pole of the plurality of stator poles such that a displacement of the first rotor pole along the radial direction produces an identical overlap of the first rotor pole with the first stator pole.

19. The switched reluctance motor of claim 1, wherein a first rotor pole component of the plurality of rotor poles possesses a surface area that is less than a surface area of a first stator pole of the plurality of stator poles such that a displacement of the first rotor pole along the radial direction changes an overlap of the first rotor pole with the first stator pole.

20. The switched reluctance motor of claim 1, wherein each of the plurality of stator poles and the plurality of rotor poles comprises a toothed shape along a sub-pole direction producing a segmented interface between the plurality of stator poles and the plurality of rotor poles.

21. The switched reluctance motor of claim 1, wherein the first sub-pole and the second sub-pole of each of the plurality of stator poles have substantially the same shape in radial cross-section.

22. A switched reluctance motor comprising:
a plurality of stator poles arranged along a circumferential direction of an axis of rotation, the axis of rotation defining an axial direction, a radial direction, and the circumferential direction; and,
a plurality of rotor poles arranged along the circumferential direction, the plurality of rotor poles arranged along the axial direction with respect to the plurality of stator poles to rotate across the plurality of stator poles, each of the plurality of rotor poles comprising a first rotor pole component and a second rotor pole component disposed on opposite axial sides of the plurality of stator poles,
each of the plurality of stator poles being circumferentially adjacent to another stator pole of substantially the same structure,
each of the plurality of stator poles comprising at least a first sub-pole and a second sub-pole arranged along the radial direction from the first sub-pole such that at least a portion of magnetic flux from the first sub-pole flows radially through the first rotor pole component, axially through the second sub-pole, radially through the second rotor pole component and axially back through the first sub-pole, and,
as the plurality of rotor poles rotate with respect to the plurality of stator poles, the magnetic flux exerting a rotating force on the plurality of rotor poles.

* * * * *